United States Patent
Hoshino et al.

(10) Patent No.: US 7,600,776 B2
(45) Date of Patent: Oct. 13, 2009

(54) KNEE AIRBAG DEVICE

(75) Inventors: Shigeru Hoshino, Toyota (JP); Osamu Fukawatase, Nishikamo-gun (JP); Tomoyuki Moro, Toyota (JP); Kenji Imamura, Kosai (JP); Akiyoshi Sanada, Nishikamo-gun (JP); Yuichi Adachi, Nishikasugai-gun (JP); Kazuaki Bito, Nishikasugai-gun (JP)

(73) Assignees: Toyota Jidosha Kabushiki Kaisha, Toyota (JP); Toyota Gosei Co., Ltd., Nishikasugai-gun (JP)

( * ) Notice: Subject to any disclaimer, the term of this patent is extended or adjusted under 35 U.S.C. 154(b) by 0 days.

(21) Appl. No.: 12/003,914

(22) Filed: Jan. 3, 2008

(65) Prior Publication Data

US 2008/0174091 A1 Jul. 24, 2008

(30) Foreign Application Priority Data

Jan. 18, 2007 (JP) ............................. 2007-009227

(51) Int. Cl.
  *B60R 21/16* (2006.01)
(52) U.S. Cl. .................................... 280/730.1; 280/752
(58) Field of Classification Search .............. 280/730.1, 280/728.3, 752
 See application file for complete search history.

(56) References Cited

U.S. PATENT DOCUMENTS

| | | | |
|---|---|---|---|
| 5,570,901 A * | 11/1996 | Fyrainer | .................. 280/730.1 |
| 6,695,339 B2 | 2/2004 | Hayashi | |
| 7,182,365 B2 * | 2/2007 | Takimoto et al. | .......... 280/730.1 |
| 7,370,881 B2 * | 5/2008 | Takimoto et al. | ......... 280/730.1 |
| 2003/0107206 A1 * | 6/2003 | Takimoto et al. | ......... 280/730.1 |
| 2003/0132617 A1 * | 7/2003 | Takimoto et al. | ......... 280/730.1 |
| 2007/0132215 A1 * | 6/2007 | Takimoto et al. | ......... 280/730.1 |
| 2007/0182134 A1 * | 8/2007 | Mizuno et al. | ........... 280/730.1 |
| 2008/0116669 A1 * | 5/2008 | Adachi et al. | ............ 280/730.1 |
| 2008/0217888 A1 * | 9/2008 | Fukawatase et al. | ..... 280/730.1 |

FOREIGN PATENT DOCUMENTS

| | | |
|---|---|---|
| JP | A 08-301054 | 11/1996 |
| JP | A 09-104317 | 4/1997 |
| JP | A 10-071911 | 3/1998 |
| JP | B2 2759065 | 3/1998 |
| JP | A 2001-106013 | 4/2001 |
| JP | A 2002-037003 | 2/2002 |
| JP | A 2002-356136 | 12/2002 |
| JP | B2 3752920 | 12/2005 |
| JP | B2 3760424 | 1/2006 |

* cited by examiner

*Primary Examiner*—Faye M. Fleming
(74) *Attorney, Agent, or Firm*—Oliff & Berridge, PLC

(57) ABSTRACT

When a knee airbag is deployed, a lid, which is provided in a column cover that covers a steering column, is opened by the deployment pressure of the knee airbag. Thus, an opening, through which the knee airbag expands, is formed to extend in the lower wall portion and the right and left side wall portions of the column cover. At this time, an opening amount regulation portion regulates the opening amount of the lid so that the knee airbag is deployed toward areas on right and left sides of the column cover.

19 Claims, 11 Drawing Sheets

KNEE AIRBAG DEVICE

INCORPORATION BY REFERENCE

The disclosure of Japanese Patent Application No. 2007-009227 filed on Jan. 18, 2007 including the specification, drawings and abstract is incorporated herein by reference in its entirety.

BACKGROUND OF THE INVENTION

1. Field of the Invention

The invention relates to a knee airbag device.

2. Description of the Related Art

Japanese Patent Application Publication No. 2002-37003 (JP-A-2002-37003) describes a knee airbag device that includes an airbag module fixed to a column tube inside a column cover that covers a steering column. Airbag doors are provided in two portions (right and left portions) of the column cover. When a knee airbag is deployed, tear portions are torn, and thus, the airbag doors are opened toward right and left sides. As a result, two openings (right and left openings) are formed in the column cover, and the knee airbag expands radially around the steering column, that is, toward areas on right and left sides of the steering column through the openings.

However, in the above-described conventional knee airbag device, it is difficult to quickly deploy the knee airbag toward the areas on right and left sides of the steering column, while satisfying requirements regarding the stiffness, serviceability, cost, and weight of the column cover, and easiness of assembling the column cover.

SUMMARY OF THE INVENTION

The invention improves the performance of restraining knees of an occupant by quickly deploying a knee airbag toward areas on right and left sides of a column cover in front of the knees of the occupant, while satisfying requirements regarding stiffness and the like of the column cover.

A first aspect of the invention relates to a knee airbag device that includes: a knee airbag that is disposed in a folded state inside a column cover that covers a steering column, wherein when the knee airbag receives gas, the knee airbag is inflated and deployed from an inside of the column cover toward knees of an occupant; a lid that is provided in the column cover, and that covers an opening through which the knee airbag expands, wherein when the lid is opened by a deployment pressure of the knee airbag, the opening is formed to extend in a lower wall portion and right and left side wall portions of the column cover; and an opening amount regulation portion that regulates an opening amount of the lid.

In the knee airbag device according to the first aspect, when the lid, provided in the column cover that covers the steering column, is opened by the deployment pressure of the knee airbag, the opening, through which the knee airbag expands, is formed to extend in the lower wall portion and the right and left side wall portions of the column cover. At this time, the opening amount regulation portion regulates the opening amount of the lid. Therefore, the knee airbag is deployed toward areas on right and left sides of the column cover along side edge portions of the column cover, which define side portions of the opening in the side wall portions of the column cover. Therefore, it is possible to improve the performance of restraining the knees of the occupant by quickly deploying the knee airbag toward the areas on the right and left sides of the column cover in front of the knees of the occupant.

In the first aspect, a hinge portion may be provided in a first end portion of the lid in an axial direction of the steering column; the hinge portion may support the lid when the lid is opened; and the opening amount regulation portion may be provided in a second end portion of the lid, which is opposite to the first end portion.

According to the above-described aspect, the hinge portion is provided in the first end portion of the lid in the axial direction of the steering column. The hinge portion supports the lid when the lid is opened. The opening amount regulation portion is provided in a second end portion of the lid, which is opposite to the first end portion. Therefore, when the knee airbag is inflated and deployed, the lid pivots around the hinge portion until the lid reaches a deployment position regulated by the opening amount regulation portion. Thus, the knee airbag is deployed toward the areas on the right and left sides of the column cover along the side edge portions that define the side portions of the opening. Therefore, it is possible to quickly deploy the knee airbag toward the areas on the right and left sides of the column cover, using the simple configuration.

In the above-described aspect, the opening amount regulation portion may be provided in each of both end portions of the lid in an axial direction of the steering column.

According to the above-described aspect, the opening amount regulation portion is provided in each of both end portions of the lid in the axial direction of the steering column. Therefore, when the knee airbag is inflated and deployed, the lid is moved downward to the deployment position regulated by the opening amount regulation portion, and thus the lid is opened. Accordingly, a larger opening is formed in each side wall portion of the column cover. Thus, it is possible to quickly deploy the knee airbag toward the areas on the right and left sides of the column cover, along the side edge portions that define the side portions of the opening.

In the above-described aspect, the lid may be formed integrally with the column cover.

According to the above-described aspect, the lid is formed integrally with the column cover. When the knee airbag is inflated and deployed, a tear portion around the lid is torn, and the lid is opened. As a result, the opening, through which the knee airbag expands, is formed to extend in the lower wall portion and the right and left side wall portions of the column cover. Thus, it is possible to quickly deploy the knee airbag toward the areas on the right and left sides of the column cover, while reducing the cost and the weight of each of the column cover and the lid.

In the above-described aspect, the lid may be formed separately from the column cover. The lid may be disposed to cover the opening.

According to the above-described aspect, the lid is formed separately from the column cover. The lid is disposed to cover the opening through which the knee airbag expands. Therefore, the lid is easily opened by the deployment pressure of the knee airbag. Thus, the lid is stably opened.

In the above-described aspect, right and left side portions of the lid may be apart from side edge portions of the column cover, which define side portions of the opening in the side wall portions of the column cover.

According to the above-described aspect, the right and left side portions of the lid are apart from the side edge portions of the column cover, which define the side portions of the opening in the side wall portions of the column cover. Therefore, when the deployment pressure of the knee airbag is applied to the lid, the side portions of the lid are easily removed from the side edge portions that define the side portions of the opening in the side wall portions of the column cover. Therefore, when the knee airbag is inflated and deployed, the opening, through which the knee airbag expands, is formed to extend in the lower wall portion and the right and left side portions of the column cover.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

First Embodiment

Figure 1:
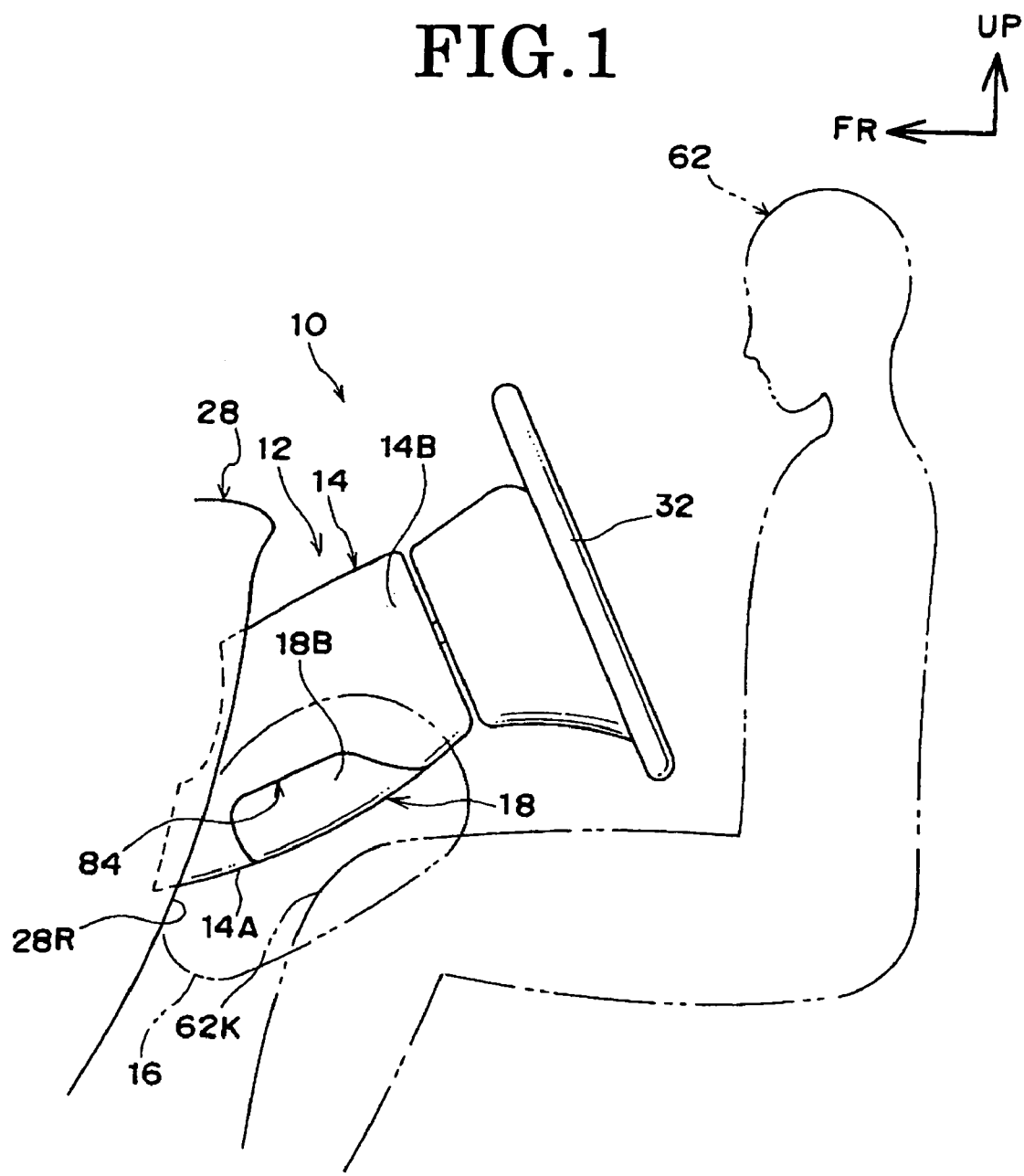
FIG. 1 is a lateral view of a knee airbag device according to a first embodiment.
Figure 2:
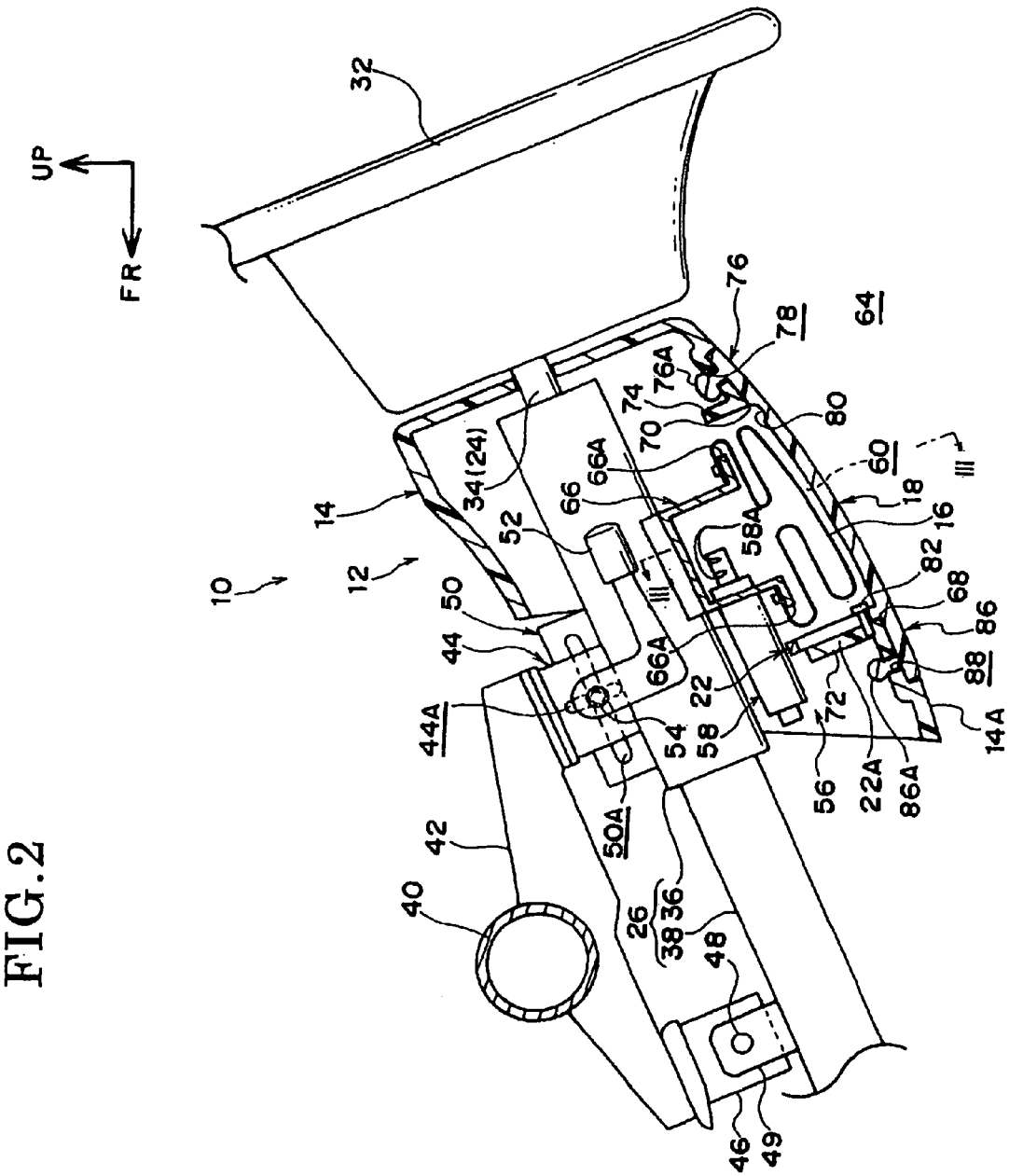
FIG. 2 is a cross sectional view of the knee airbag device.

In FIG. 1, a knee airbag device 10 according to a first embodiment includes a knee airbag 16 (FIG. 2), a lid 18, and a slide stopper 22 (FIG. 2). The knee airbag 16 is disposed in a folded state inside a column cover 14 that covers a steering column 12. The slide stopper 22 is an example of the opening amount regulation portion.

In FIG. 2, the steering column 12 is manually-tiltable and manually-telescopic. The steering column 12 includes a steering main shaft 24, and a column tube 26. The steering main shaft 24 is disposed in the core of the steering column 12. The column tube 26, which covers the steering main shaft 24, is supported by a vehicle body. The steering column 12 is inserted through an opening portion (not shown) formed on an instrument panel 28. The column cover 14 protrudes from the instrument panel 28 toward the rear of a vehicle (refer to FIG. 1). A steering wheel 32 is attached to the end of the steering main shaft 24. The steering wheel 32 is used to steer the vehicle.

The steering main shaft 24 and the column tube 26 can be contracted in the axial direction of the steering main shaft 24.

More specifically, the steering main shaft 24 includes an upper steering main shaft 34 and a lower steering main shaft (not shown). The upper steering main shaft 34 is disposed closer to the rear of the vehicle than the lower steering main shaft is. The lower steering main shaft is disposed closer to the front of the vehicle than the upper steering main shaft 34 is. The front end portion of the upper steering main shaft 34 and the rear end portion of the lower steering main shaft overlap each other by a predetermined overlap length, and are connected to each other through spiline fitting. Thus, by telescopically operating the steering main shaft 24, it is possible to adjust the position of the steering wheel 32 in a vehicle-longitudinal direction. When a load equal to or higher than a predetermined value is applied toward the front of the steering main shaft 24 in the axial direction from the steering wheel 32, the steering main shaft 24 is contracted (i.e., moved in the axial direction) in a range of a predetermined stroke.

Because the upper steering main shaft 34 and the lower steering main shaft are connected to each other through spline fitting, one of the upper steering main shaft 34 and the lower steering main shaft is not rotatable with respect to the other. Thus, a steering force applied to the steering wheel 32 is transmitted to an intermediate shaft (not shown) through the steering main shaft 24, and then, transmitted to a steering gear box. The intermediate shaft can be contracted as well as the steering main shaft 24. When a load equal to or higher than a predetermined value (i.e., upthrust load) is input to the intermediate shaft from the steering gear box (not shown), the intermediate shaft is contracted (i.e., moved in the axial direction) in a range of a predetermined stroke.

The column tube 26 has a double tube structure. That is, the column tube 26 includes an outer tube 36 and an inner tube 38. The outer tube 36 is disposed closer to the rear of the vehicle than the inner tube 38 is. The inner tube 38 is disposed closer to the front of the vehicle than the outer tube 36 is. The steering main shaft 24 is supported in the column tube 26 using a bearing (not shown) such that the steering main shaft 24 is rotatable with respect to the column tube 26. In the embodiment, for example, the outer tube 36 has a larger diameter than that of the inner tube 38. In the case where the steering column 12 is manually-tiltable and manually-telescopic, the outer tube 36 generally has a larger diameter than that of the inner tube 38. However, unlike the embodiment, the outer tube 36 may have a smaller diameter than that of the inner tube 38.

The above-described column tube 26 is disposed inside the instrument panel 28. The column tube 26 is supported by an instrument panel reinforcement 40 that extends in a vehicle-width direction. A steering support 42 is fixed to the instrument panel reinforcement 40 by welding or the like at a position where the steering column 12 is disposed in the plan view of the vehicle. An upper bracket 44 is fastened to the lower portion of the rear end of the steering support 42 using a bolt or the like. A long hole 44A is formed in the upper bracket 44. For example, the long hole 44A extends in a direction that is substantially perpendicular to the axial direction of the steering column 12. When the steering column 12 is tilted, the long hole 44A is used to guide the movement of the steering column 12.

A lower bracket 46 is fastened to the lower portion of the front end of the steering support 42 using a bolt or the like. The lower bracket 46 is integrated with the outer tube 36. When the steering column 12 is tilted, the steering column 12 pivots around the lower bracket 46. A bracket 49, which is fixed to the upper portion of the inner tube 38, is connected to the lower bracket 46 using a pin 48. The steering column 12 pivots around the pin 48 in a vehicle-height direction, and thus, the steering column 12 is tilted.

A guide member 50, which has a long hole 50A, is fixed to the upper portion of the outer tube 36. The long hole 50A extends in parallel with the axial direction of the steering column 12. The guide member 50 is disposed such that the long hole 50A overlaps the long hole 44A of the upper bracket 44 in the vehicle-width direction. The lock shaft 54 of a lock lever 52 extends through the long holes 44A and 50A in the vehicle-width direction.

When the lock lever 52 is at a fixation position as shown in FIG. 2, the upper bracket 44 and the guide member 50 are fixed to each other. When the lock lever 52 is at a release position (not shown), the upper bracket 44 and the guide member 50 are movable with respect to each other. That is, when the lock lever 52 is at the release position, because the lock shaft 54 is relatively movable in the long hole 50A of the guide member 50, the steering column 12 can be telescopically operated, that is, the outer tube 36 is movable with respect to the inner tube 38 in the axial direction thereof so that the column tube 26 is contracted. Also, when the lock lever 52 is at the release position, because the lock shaft 54 is relatively movable in the long hole 44A of the upper bracket 44, the steering column 12 can be tilted, that is, the steering column 12 is pivotable around the pin 48 in the vehicle-height direction. The mechanism for tilting, or telescopically operating the steering column 12 is not limited to the above-described mechanism. The mechanism is not limited to the manually-operated mechanism either. An electrically operated mechanism may be employed.

When a load equal to or higher than a predetermined value is input to the steering column 12 in the axial direction from the steering wheel 32, the upper bracket 44 is removed from the steering support 42. Thus, the steering column 12 is contracted toward the front of the vehicle to absorb an impact.

Figure 3:
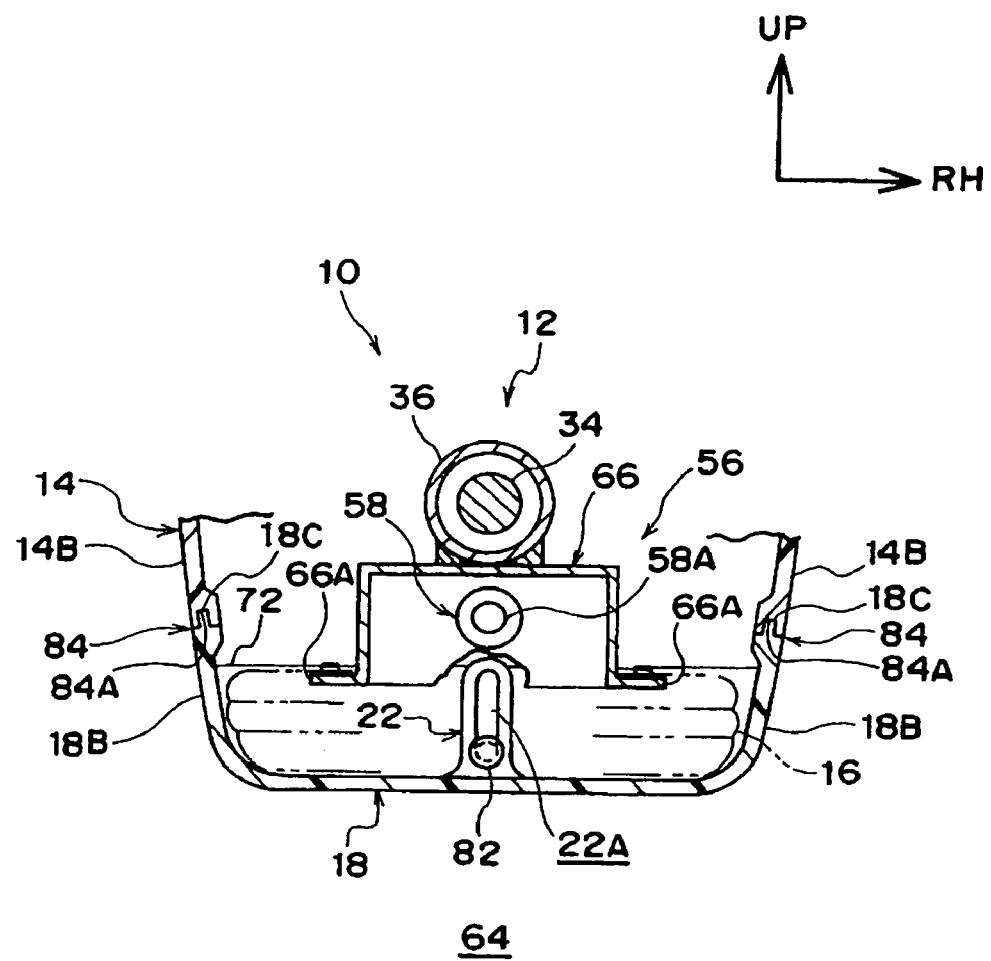
FIG. 3 is a cross sectional view of the knee airbag device, taken along line III-III in FIG. 2.

As shown in FIG. 2 and FIG. 3, an airbag module 56 is stored inside a column cover 14. The airbag module 56 includes the knee airbag 16 in the folded state, and an inflator 58 that supplies the gas to the knee airbag 16 to deploy the knee airbag 16. The inflator 58 is operated by ignition current supplied from an airbag ECU (not shown). When the knee airbag 16, which receives the gas from the inflator 58, is inflated and deployed, the lid 18 provided in the column cover 14 is opened by the deployment pressure of the knee airbag 16. As a result, an opening 60 (FIG. 5) is formed by opening the lid 18, and the knee airbag 16 expands through the opening 60 toward the knees 62K of an occupant 62, that is, into a vehicle cabin 64 (refer also to FIG. 1).

More specifically, an attachment bracket 66 is provided in the lower portion of the outer tube 36. The attachment bracket 66 has a container shape, that is, the lower portion of the attachment bracket 66 is open. The inflator 58 is attached to the attachment bracket 66. For example, the inflator 58 is disposed in substantially parallel with the axial direction of the steering column 12 at a position below the steering column 12. The end portion of the inflator 58, in which gas injection ports 58A are formed, is inserted in the attachment bracket 66, for example, from the front portion of the attachment bracket 66. A flange portion 66A is provided in the lower portion of the attachment bracket 66. The flange portion 66A is covered with the edge portion of the knee airbag 16. The edge portion of the knee airbag 16 is fastened to the flange portion 66A using bolts or the like. After the gas is injected from the gas injection ports 58A of the inflator 58, the gas is guided into the knee airbag 16 by the attachment bracket 66. The configuration of the airbag module 56 is not limited to the configuration shown in FIG. 2 and FIG. 3.

Figure 5:
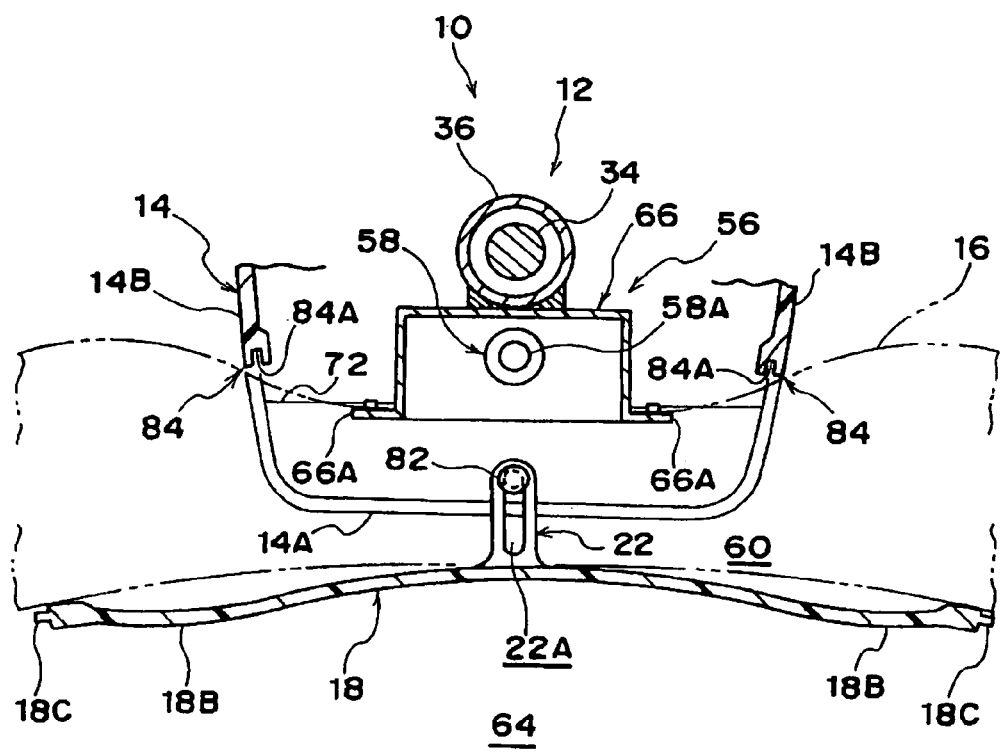
FIG. 5 is a cross sectional view of the knee airbag device in which the knee airbag is deployed, taken along line V-V in FIG. 4.

In FIG. 1 to FIG. 3, the lid 18 is formed separately from the column cover 14. The lid 18 is disposed to cover the opening 60 (refer to FIG. 5) formed in the column cover 14. The knee airbag 16 expands through the opening 60. As shown in FIG. 5, the opening 60 is formed to extend in the lower wall portion 14A and the right and left side wall portions 14B of the column cover 14. A front rib 72 and a rear rib 74 stand on the inner surface of the column cover 14 at a front edge portion 68 and a rear edge portion 70 that define the lower portion of the opening 60 in the lower wall portion 14A. The front rib 72 and the rear rib 74 are wall portions that prevent the knee airbag 16 from expanding in a vehicle-longitudinal direction inside the column cover 14. For example, the front rib 72 and the rear rib 74 stand such that the top portions of the front rib 72 and the rear rib 74 overlap the flange portion 66A of the attachment bracket 66 in the axial direction of the steering column 12.

The lid 18 is formed integrally with a proximal portion 76. The proximal portion 76 is engaged with, and fixed to the lower wall portion 14A of the column cover 14. The proximal portion 76 is provided in the rear portion of the lid 18. An engagement protrusion 76A is provided on the inner surface of the proximal portion 76. An attachment hole 78 is formed in the lower wall portion 14A of the column cover 14 at a position behind the rear edge portion 70 that defines the lower portion of the opening 60. The engagement protrusion 76A of the proximal portion 76 is engaged with the attachment hole 78.

A hinge portion 80, which extends in the vehicle-width direction, is provided in one end portion of the lid 18 in the axial direction of the steering column 12, for example, at a position adjacent to the proximal portion 76 provided in the rear portion of the lid 18. The hinge portion 80 supports the lid 18 when the lid 18 is opened. A slide stopper 22 is provided in the other end portion of the lid 18 in the axial direction of the steering column 12, for example, at a position adjacent to the front edge portion 68 of the column cover 14, which defines the lower portion of the opening 60. Further, hinge portions (not shown), which extend in the axial direction of the steering column 12, may be provided in the lid 18 at border portions between the lower portion and the side portions of the lid 18. In this case, the hinge portions support the side portions of the lid 18 when the side portions are opened. When the knee airbag 16 is deployed, the side portions of the lid 18 are opened toward right and left sides in the vehicle-width direction using the hinge portions. As a result, the side portions and the lower portion of the lid 18 extend on the same plane.

More specifically, in FIG. 2 and FIG. 3, for example, the slide stopper 22 is a flexible member that has a strip shape. The slide stopper 22 is formed integrally with the inner surface of the lid 18. The slide stopper 22 extends upward from the inner surface of the lid 18, along the rear surface of the front rib 72. The slide stopper 22 has a long hole 22A that extends in the vehicle-height direction. The opening amount of the lid 18 is set by adjusting the length of the long hole 22A. For example, the opening amount of the lid 18 may be set so that the lid 18 does not contact the knees 62K of the occupant 62 (refer to FIG. 1) when the lid 18 is opened downward. The opening amount of the lid 18 is a distance between the lowest portion of the lid 18 and the lower wall portion 14A of the column cover 14 when the lid 18 is opened. Also, as shown in FIG. 3, for example, the slide stopper 22 is disposed at a center of the lid 18 in the vehicle-width direction, that is, at a position directly under the steering column 12. A stopper pin 82 is inserted in the long hole 22A of the slide stopper 22. The stopper pin 82 is formed to have a diameter slightly smaller than the width of the long hole 22A so that the stopper pin 82 is relatively movable in the long hole 22A when the lid 18 is opened. However, the head portion of the stopper pin 82 is formed to have a diameter larger than the width of the long hole 22A, to prevent the slide stopper 22 from being removed from the stopper pin 82.

The stopper pin 82 is fixed to, for example, the lower portion of the front rib 72 of the column cover 14 so that the stopper pin 82 is positioned at the lower end of the long hole 22A of the slide stopper 22. Thus, when the knee airbag 16 is inflated and deployed, the lid 18 pivots downward around the hinge portion 80 provided in the rear portion of the lid 18, until the upper end of the long hole 22A of the slide stopper 22 reaches the stopper pin 82. The stopper pin 82 may be formed integrally with the column cover 14, or may be formed separately from the column cover 14.

The lid 18 includes an extension portion 86 positioned ahead of the front edge portion 68 of the column cover 14, which defines the lower portion of the opening 60. An engagement protrusion 86A is provided on the inner surface of the extension portion 86. An attachment hole 88 is formed in the lower wall portion 14A of the column cover 14 at a position ahead of the front edge portion 68 that defines the lower portion of the opening 60. The engagement protrusion 86A of the extension portion 86 is engaged with the attachment hole 88. The size of the head portion of the engagement protrusion 86A is set so that the engagement protrusion 86A is disengaged from the attachment hole 88 when the deployment pressure of the knee airbag 16 is applied to the lid 18. The size of the head portion of the engagement protrusion 76A of the proximal portion 76 is larger than the size of the head portion of the engagement protrusion 86A so that the engagement protrusion 76A is not disengaged from the attachment hole 78 when the lid 18 is opened.

In FIG. 3, for example, side edge portions 84 that define the side portions of the opening 60 in the side wall portions 14B of the column cover 14 are disposed at a position equal to or higher than the position of the flange portion 66A of the attachment bracket 66. This configuration makes it possible to smoothly inflate and deploy the knee airbag 16 toward areas on the sides of the column cover 14 in the vehicle-width direction. Recessed portions 84A are formed in the side edge portions 84 that define the side portions of the opening 60. Protrusions 18C are formed in the edges of the side portions 18B of the lid 18. The protrusions 18C are engaged with the recessed portions 84A. The protrusions 18C and the recessed portions 84A are provided to position the side portions 18B of the lid 18 with respect to the side wall portions 14B of the column cover 14, and to ensure appropriate surface stiffness of the side portions 18B.

It is preferable that the side portions 18B of the lid 18 should be easily disengaged from the side wall portions 14B of the column cover 14, to quickly inflate and deploy the knee airbag 16 toward the areas on the sides of the column cover 14 along the side edge portions 84 that define the side portions of the opening 60. Thus, the side portions 18B of the lid 18 are not firmly engaged with the side wall portions 14B of the column cover 14. The protrusions 18C may be appropriately engaged with the recessed portions 84A as long as the side portions 18B of the lid 18 are easily disengaged from the side wall portions 14B of the column cover 14. In this case, the side wall portions 14B stably retain the side portions 18B when the lid is not opened.

The knee airbag device 10 according to the first embodiment has the above-described configuration. Hereinafter, the advantageous effects obtained in the first embodiment will be described. In FIG. 2, when the knee airbag device 10 is used at normal times, the lid 18 is attached to the column cover 14 by engaging the engagement protrusions 76A and 86A with the attachment holes 78 and 88, respectively. Thus, the lid 18 is easily attached to the column cover 14. Also, serviceability (maintainability) of the lid 18 and the column cover 14 is good. Also, in FIG. 3, when the lid 18 is attached to the column cover 14, the protrusions 18C formed in the edges of the side portions 18B are inserted in the recessed portions 84A formed in the side edge portions 84 that define the side portions of the opening 60. Therefore, it is possible to easily position the side portions 18B of the lid 18 with respect to the side wall portions 14B of the column cover 14. For example, each side portion 18B of the lid 18 and the corresponding side wall portion 14B of the column cover 14 can be maintained on one plane. Thus, it is possible to ensure appropriate surface stiffness of each side wall portion 14B of the column cover 14 and appropriate surface stiffness of each side portion 18B of the lid 18 when the lid 18 is not opened.

Next, the advantage effects obtained when the knee airbag 16 is inflated and deployed will be described. In FIG. 1, in the knee airbag device 10, when the vehicle has, for example, a frontal collision, and the airbag ECU (not shown) determines that the vehicle has a frontal collision, the airbag ECU supplies the ignition current to the inflator 58, and the inflator 58 is operated. Thus, a large amount of gas is injected from the gas injection ports 58A of the inflator 58, and the gas is supplied to the knee airbag 16 in the folded state. Then, the knee airbag 16 starts to be deployed. Thus, the lid 18 provided in the column cover 14 is pushed and opened by the deployment pressure of the knee airbag 16.

Figure 4:
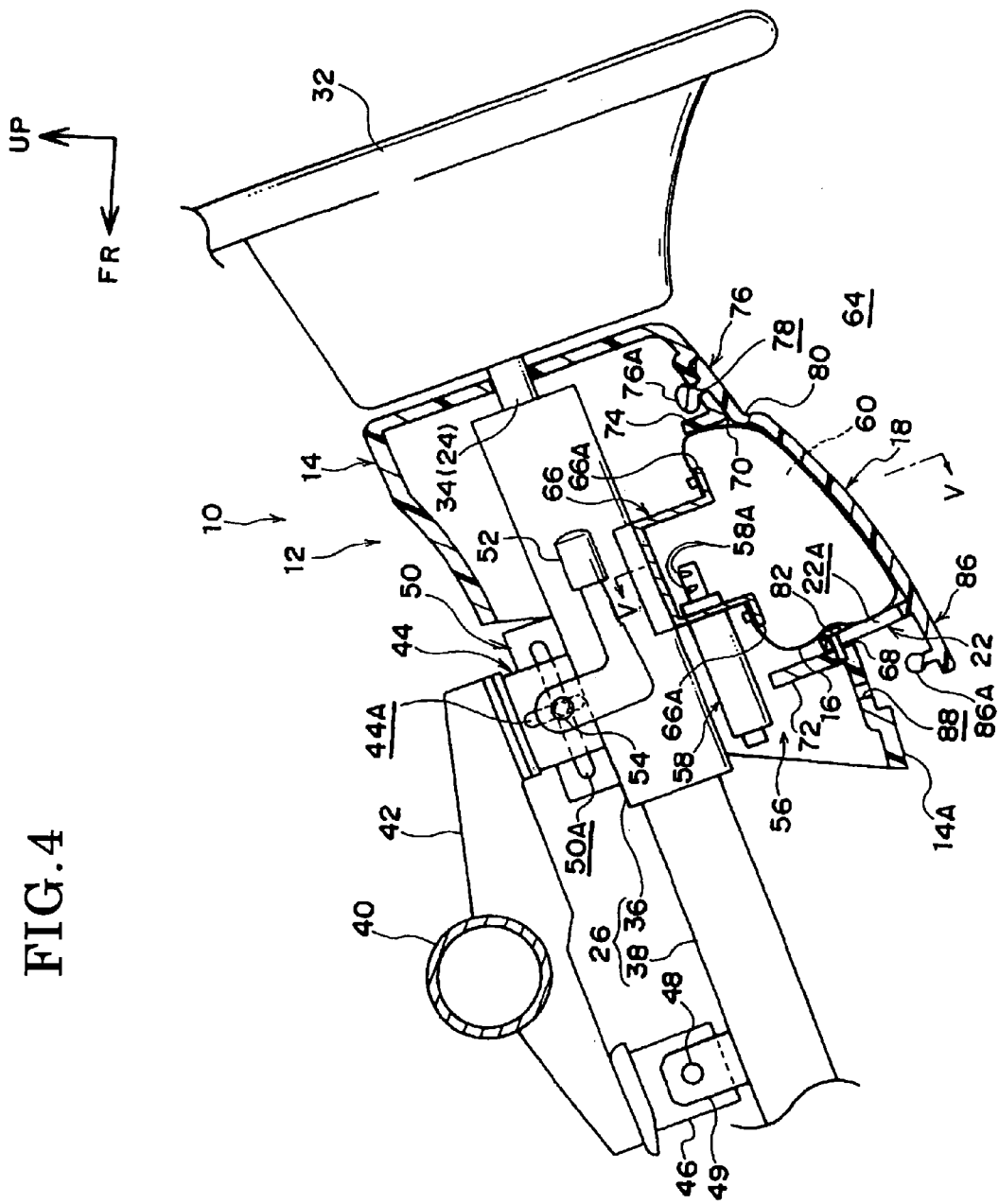
FIG. 4 is a cross sectional view of the knee airbag device in which a knee airbag is deployed.

More specifically, as shown in FIG. 4, when the deployment pressure of the knee airbag 16 is applied to the lid 18, the engagement protrusion 86A is disengaged from the attachment hole 78. As a result, the lid 18 pivots downward around the hinge portion 80 provided in the rear portion of the lid 18, until the lid 18 reaches a deployment position regulated by the slide stopper 22, that is, until the upper end of the long hole 22A of the slide stopper 22 reaches the stopper pin 82. Because the slide stopper 22 regulates the opening amount of the lid 18, it is possible to prevent the lid 18 from contacting the knees 62K of the occupant 62 (refer to FIG. 1). Also, because the opening amount of the lid 18 is regulated, it is possible to prevent the knee airbag 16 from being deployed toward an area between the knees 62K of the occupant 62. Thus, the gas in the knee airbag 16 is forcibly delivered toward the portions of the knee airbag 16 on the right and left sides of the column cover 14. This makes it possible to efficiently deploy the knee airbag 16 toward the areas on the right and left sides of the column cover 14. That is, in the knee airbag device 10, by regulating the downward deployment of the knee airbag 16, it is possible to deploy the knee airbag 16 toward the areas on the right and left sides of the column cover 14.

As shown in FIG. 3, before the lid 18 is opened, the protrusions 18C formed in the side portions 18B of the lid 18 are inserted in the recessed portions 84A formed in the side edge portions 84 that define the side portions of the opening 60. However, the side portions 18B are not firmly engaged with the side wall portions 14B of the column cover 14. Therefore, as shown in FIG. 5, when the lid 18 is opened, the side portions 18B are easily disengaged from the side wall portions 14B of the column cover 14. As a result, the opening 60, through which the knee airbag 16 expands, is quickly formed to extend in the lower wall portion 14A and the right and left side wall portions 14B of the column cover 14. Thus, it is possible to deploy the knee airbag 16 toward the areas on the right and left sides of the column cover 14, along the side edge portions 84 that define the side portions of the opening 60. At this time, the side portions 18B of the lid 18 fall and are deformed due to the deployment of the knee airbag 16. As a result, the lid 18 is made flat. Thus, the side portions 18B do not interfere with the deployment of the knee airbag 16 toward the areas on the right and left sides of the column cover 14. Also, as shown in FIG. 4, the front rib 72 and the rear rib 74 are provided at the edge portions 68 and 70 defining the opening 60, respectively. Therefore, it is possible to suppress the deployment of the knee airbag 16 in the vehicle-longitudinal direction inside the column cover 14.

Thus, in the knee airbag device 10, the opening 60, through which the knee airbag 16 expands, is formed to extend in the lower wall portion 14A and the side wall portions 14B. In addition, the slide stopper 22, which is an example of the opening amount regulation portion with a simple configuration, regulates the opening amount of the lid 18. Therefore, the knee airbag 16 is quickly deployed toward the areas on the right and left sides of the column cover 14 in front of the knees 62K of the occupant 62 (refer to FIG. 1). That is, the knee airbag 16 is efficiently deployed between the knees 62K of the occupant 62 and the surface 28R of the instrument panel 28, which is positioned in front of the knees 62K of the occupant 62, and at which the reaction force used to restrain the knees 62K of the occupant 62 is generated. Also, by deploying the knee airbag 16 along the side edge portions 84 that define the side portions of the opening 60, it is possible to suppress the movement of the knee airbag 16 in the vehicle-longitudinal direction, thereby reliably deploying the knee airbag 16 in desired areas when the knee airbag 16 restrains the knees 62K. Thus, in the knee airbag device 10, it is possible to improve the performance of restraining the knees 62K of the occupant 64, while satisfying the requirements regarding the stiffness of the column cover 14.

In the embodiment, the slide stopper 22 is provided in the lid 18, and the stopper pin 82 is provided in the column cover 14. However, the invention is not limited to this configuration. For example, the slide stopper 22 may be provided in the column cover 14, and the stopper pin 82 may be provided in the lid 18. Also, a deformation facilitation portion (not shown) that facilitates deformation of the lid 18, such as a hinge portion, may be provided in the lower edge portion of each side portion 18B of the lid 18. With this configuration, each side portion 18B falls and is deformed more easily.

Second Embodiment

Figure 6:
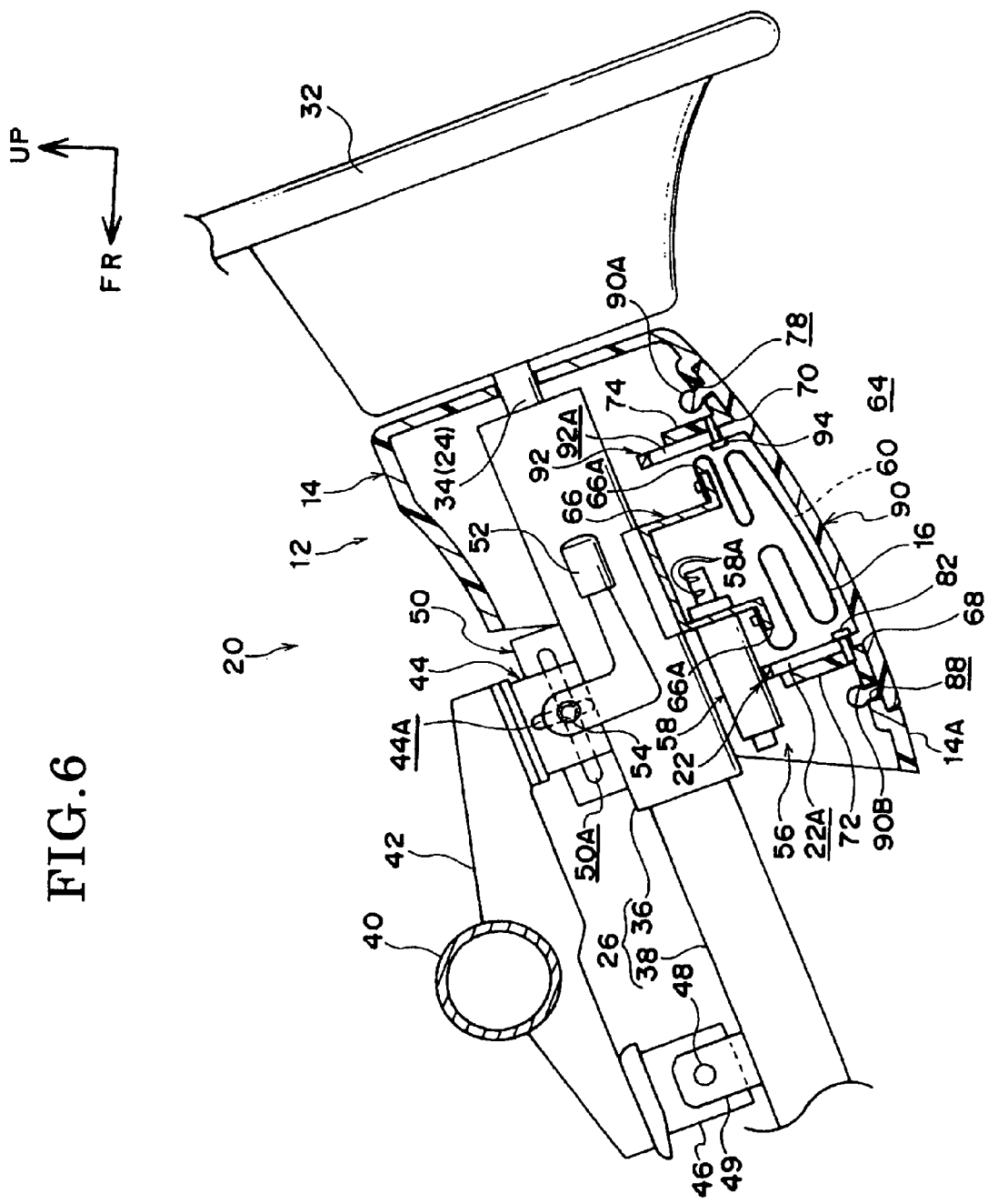
FIG. 6 is a cross sectional view of a knee airbag device according to a second embodiment.

In FIG. 6, in a knee airbag device 20 according to a second embodiment, a lid 90 is formed separately from the column cover 14. The lid 90 is disposed to cover the opening 60 formed in the column cover 14. The knee airbag 16 expands through the opening 60. Slide stoppers 22 and 92, which are examples of the opening amount regulation portion, are provided in end portions of the lid 90 in the axial direction of the steering column 12. More specifically, a rear engagement protrusion 90A is provided on the inner surface of the lid 90 in a rear end portion. A front engagement protrusion 90B is provided on the inner surface of the lid 90 in a front end portion. The rear engagement protrusion 90A is engaged with the attachment hole 78 of the column cover 14. The front engagement protrusion 90B is engaged with the attachment hole 88 of the column cover 14. The size of the head portion of the rear engagement protrusion 90A is the same as the size of the front engagement protrusion 90B. When the deployment pressure of the knee airbag 16 is applied to the lid 90, for example, the rear engagement protrusion 90A and the front engagement protrusion 90B are disengaged from the attachment holes 78 and 88, respectively, at the approximately same timing.

In the second embodiment, in addition to the front slide stopper 22, the rear slide stopper 92 is provided. For example, the rear slide stopper 92 is provided adjacent to the rear edge portion 70 of the column cover 14, which defines the lower portion of the opening 60. For example, the slide stopper 92 extends upward from the upper surface of the lid 90, along the front surface of the rear rib 74. The slide stopper 90 has a long hole 92A that has a length corresponding to the opening amount of the lid 90. For example, the opening amount of the lid 90 may be set so that the lid 90 does not contact the knees 62K of the occupant 62 (refer to FIG. 1) when the lid 90 is opened downward. Also, although not shown in the drawing, for example, the slide stopper 92 is disposed at a center of the lid 90 in the vehicle-width direction, that is, at a position directly under the steering column 12. A stopper pin 94 is inserted in the long hole 92A of the slide stopper 92. The stopper pin 94 is formed to have a diameter slightly smaller than the width of the long hole 92A so that the stopper pin 94 is relatively movable in the long hole 92A when the lid 90 is opened. However, the head portion of the stopper pin 94 is formed to have a diameter larger than the width of the long hole 92A, to prevent the slide stopper 92 from being removed from the stopper pin 94.

The stopper pin 94 is fixed to, for example, the lower portion of the rear rib 74 of the column cover 14 so that the stopper pin 94 is positioned at the lower end of the long hole 92A of the slide stopper 92. When the knee airbag 16 is inflated and deployed, the lid 90 is moved downward until the upper end of the long hole 22A of the slide stopper 22 reaches the stopper pin 82, and the upper end of the long hole 92A of the slide stopper 92 reaches the stopper pin 94. Thus, the lid 90 is opened. It is preferable that the stroke of the slide stopper 92 should be the substantially same as the stroke of the slide stopper 22, to smoothly open the lid 90 when the knee airbag 16 is inflated and deployed.

The stopper pin 94 may be formed integrally with the column cover 14, or may be formed separately from the column cover 14. Each side portion (not shown) of the lid 90 has the same shape and the like as those of each side portion 18B of the lid 18 shown in FIG. 3. Thus, appropriate surface stiffness of each side portion of the lid 90 is ensured when the knee airbag device 20 is used at normal times.

The other portions are the same as those in the first embodiment. Therefore, the same and corresponding portions are denoted by the same reference numerals in the drawings, and the description thereof will be omitted.

Figure 7:
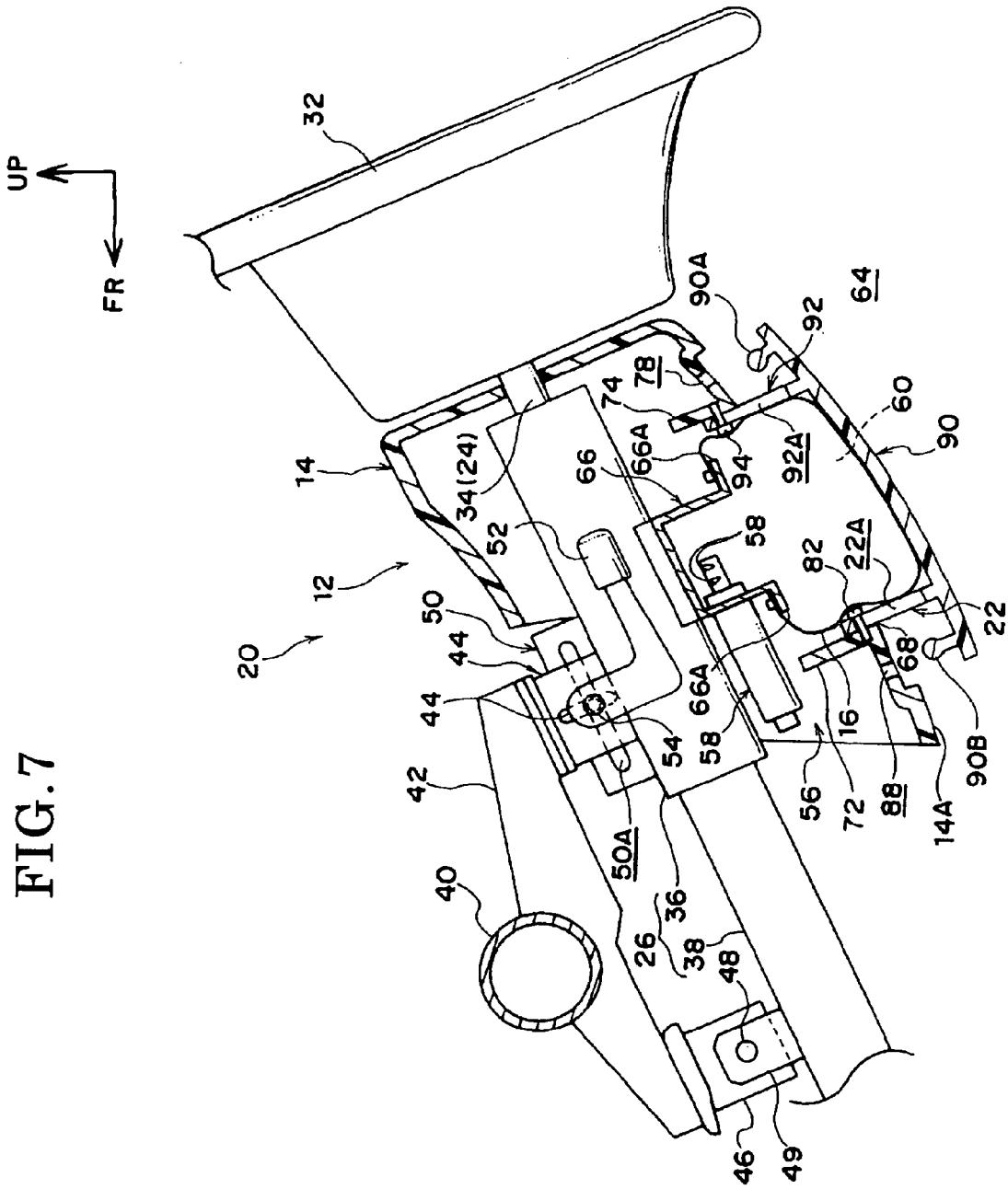
FIG. 7 is a cross sectional view of the knee airbag device in which a knee airbag is deployed.

The knee airbag device 20 according to the second embodiment has the above-described configuration. Hereinafter, the advantageous effects obtained in the second embodiment will be described. In FIG. 7, in the knee airbag device 20, the slide stoppers 22 and 92, which are examples of the opening amount regulation portion, are provided in the end portions of the lid 90 in the axial direction of the steering column 12. Therefore, when the knee airbag 16 is inflated and deployed, the lid 90 is moved downward to the deployment position regulated by the slide stoppers 22 and 92, and thus, the lid 90 is opened.

More specifically, when the deployment pressure of the knee airbag 16 is applied to the lid 90, the rear engagement protrusion 90A is disengaged from the attachment hole 78, and the front engagement protrusion 90B is disengaged from the attachment hole 88. Therefore, the entire lid 90 is moved downward to the deployment position regulated by the slide stoppers 22 and 92, and thus, the lid 90 is opened. Because the slide stoppers 22 and 92 regulate the opening amount of the lid 90, it is possible to prevent the lid 90 from contacting the knees 62K of the occupant 62 (refer to FIG. 1). Also, because the opening amount of the lid 90 is regulated, it is possible to prevent the knee airbag 16 from being deployed toward the area between the knees 62K of the occupant 62. Thus, the gas in the knee airbag 16 is forcibly delivered toward the portions of the knee airbag 16 on the right and left sides of the column cover 14. This makes it possible to efficiently deploy the knee airbag 16 toward the areas on the right and left sides of the column cover 14. That is, in the knee airbag device 20, by regulating the downward deployment of the knee airbag 16, it is possible to deploy the knee airbag 16 toward the areas on the right and left sides of the column cover 14.

The side portions of the lid 90 are not firmly engaged with the side wall portions 14B of the column cover 14, as in the case of the side portions 18B of the lid 18 according to the first embodiment as shown in FIG. 5. Therefore, the side portions of the lid 90 are easily disengaged from the side wall portions 14B. Thus, the opening 60, through which the knee airbag 16 expands, is quickly formed to extend in the lower wall portion 14A and the right and left side wall portions 14B. Further, the opening 60 is made larger than the opening 60 in the first embodiment. Thus, it is possible to deploy the knee airbag 16 toward the areas on the right and left sides of the column cover 14, along the side edge portions 84 that define the side portions of the opening 60.

In the knee airbag device 20 in the second embodiment, the front rib 72 and the rear rib 74 in the edge portions 68 and 70 that define the opening 60 suppress the deployment of the knee airbag 16 in the vehicle-longitudinal direction inside column cover 14, as in the first embodiment. Also, when the lid 90 is opened, the side portions of the lid 90 fall rightward and leftward, and are deformed, as in the first embodiment. As a result, the lid 18 is made flat. Thus, the side portions of the lid 90 do not interfere with the deployment of the knee airbag 16 toward the areas on the right and left sides of the column cover 14.

Thus, in the knee airbag device 20, the lid 90 slides downward, and accordingly, the lid 90 is opened, due to the deployment pressure of the knee airbag 16. Therefore, the opening 60 is made larger than the opening 60 in the first embodiment. As a result, it is possible to quickly deploy the knee airbag 16 along the edge portions (not shown) that define the side portions of the opening 60, toward the areas on the right and left sides of the column cover 14 in front of the knees 62K of the occupant 62 (refer to FIG. 1). Thus, it is possible to improve the performance of restraining the knees 62K of the occupant 62, while satisfying the requirements regarding to the stiffness of the column cover 14.

In the second embodiment, the slide stopper 92 is provided in the lid 90, and the stopper pin 94 is provided in the column cover 14. However, the invention is not limited to this configuration. For example, the slide stopper 92 may be provided in the column cover 14, and the stopper pin 94 may be provided in the lid 90.

Third Embodiment

Figure 8:
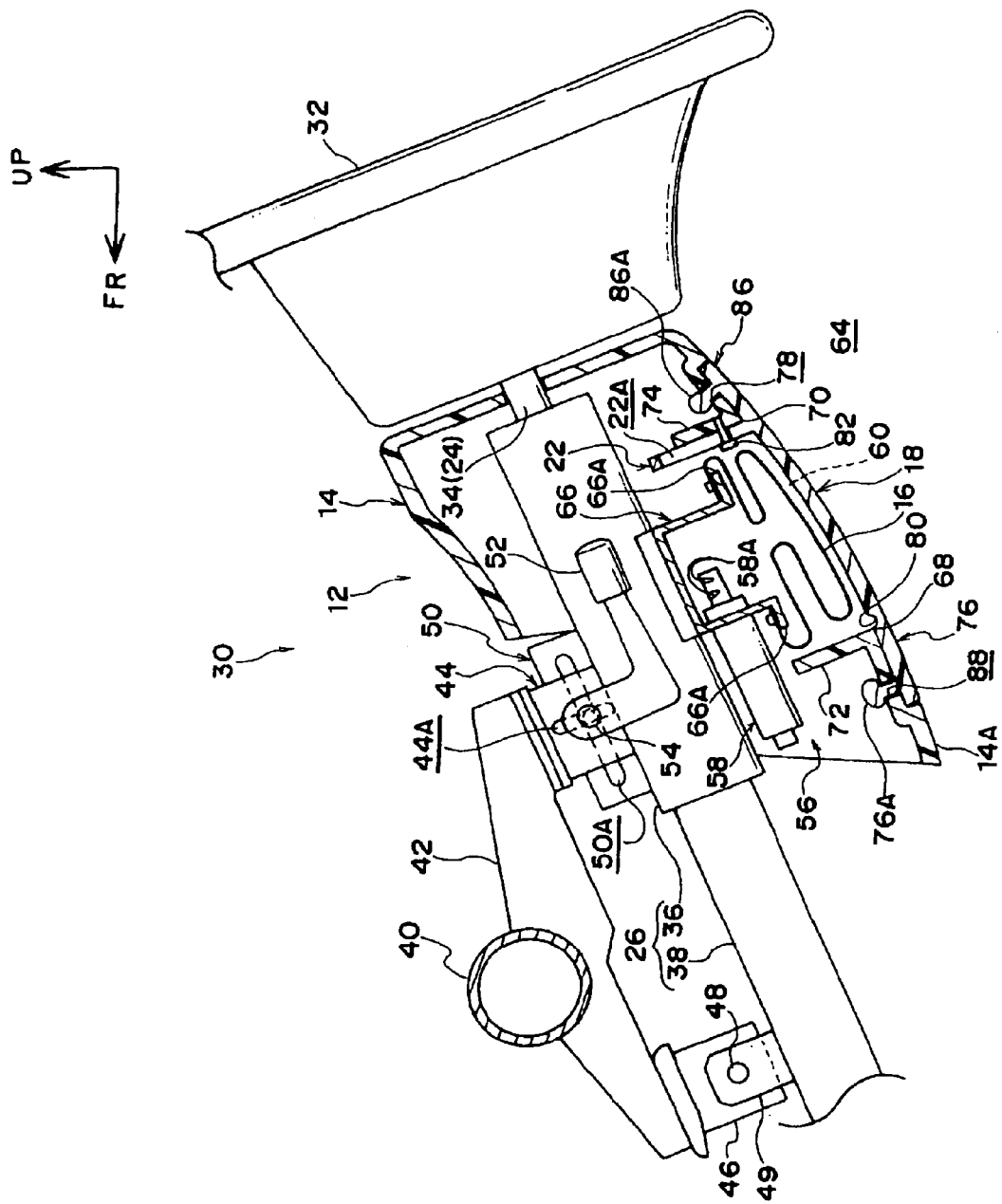
FIG. 8 is a cross sectional view of a knee airbag device according to a third embodiment.

In FIG. 8, in a knee airbag device 30 according to a third embodiment, the lid 18 pivots downward around the hinge portion 80 provided in the front portion of the lid 18, unlike the first embodiment. More specifically, the lid 18 is formed separately from the column cover 14. The lid 18 is disposed to cover the opening 60 (refer to FIG. 10) formed in the column cover 14. The knee airbag 16 expands through the opening 60. The lid 18 is formed integrally with the proximal portion 76.

The proximal portion 76 is engaged with, and fixed to the lower wall portion 14A of the column cover 14. The proximal portion 76 is provided in the front portion of the lid 18. The engagement protrusion 76A is provided on the inner surface of the proximal portion 76. The attachment hole 88 is formed in the lower wall portion 14A of the column cover 14 at a position ahead of the front edge portion 68 that defines the lower portion of the opening 60. The engagement protrusion 76A of the proximal portion 76 is engaged with the attachment hole 88.

The hinge portion 80, which extends in the vehicle-width direction, is provided in one end portion of the lid 18 in the axial direction of the steering column 12, for example, at a position adjacent to the proximal portion 76 provided in the front portion of the lid 18. The hinge portion 80 supports the lid 18 when the lid 18 is opened. The slide stopper 22 is provided in the other end portion of in the lid 18 in the axial direction of the steering column 12, for example, at a position adjacent to the rear edge portion 70 of the column cover 14, which defines the lower portion of the opening 60. The stopper pin 82 is inserted in the long hole 22A of the slide stopper 22. The stopper pin 82 is fixed to, for example, the lower portion of the rear rib 74 of the column cover 14 so that the stopper pin 82 is positioned at the lower end of the long hole 22A of the slide stopper 22. When the knee airbag 16 is inflated and deployed, the lid 18 pivots downward around the hinge portion 80 provided in the front portion of the lid 18, until the upper end of the long hole 22A of the slide stopper 22 reaches the stopper pin 82. The stopper pin 82 may be formed integrally with the column cover 14, or may be formed separately from the column cover 14.

The lid 18 includes the extension portion 86 positioned behind the rear edge portion 70 that defines the lower portion of the opening 60. The engagement protrusion 86A is provided on the inner surface of the extension portion 86. The engagement protrusion 86A of the extension portion 86 is engaged with the attachment hole 78. The attachment hole 78 is formed in the lower wall portion 14A of the column cover 14 at a position behind the rear edge portion 70 that defines the lower portion of the opening 60. When the deployment pressure of the knee airbag 16 is applied to the lid 18, the engagement protrusion 86A is easily disengaged from the attachment hole 78. In contrast, the size of the head portion of the engagement protrusion 76A of the proximal portion 76 is larger than the size of the head portion of the engagement protrusion 86A so that the engagement protrusion 76A is not disengaged from the attachment hole 78 when the lid 18 is opened.

The other portions are the same as those in the first embodiment. Therefore, the same and corresponding portions are denoted by the same reference numerals in the drawings, and the description thereof will be omitted.

The knee airbag device 30 according to the third embodiment has the above-described configuration. Hereinafter, the advantageous effects obtained in the third embodiment will be described. In the knee airbag device 30, the lid 18 is easily attached to the column cover 14. Also, serviceability (maintainability) of the lid 18 and the column cover 14 is good as in the first embodiment. Further, as in the first embodiment, it is possible to ensure appropriate surface stiffness of each side portion 18B of the lid 18 when the lid 18 is not opened.

Figure 9:
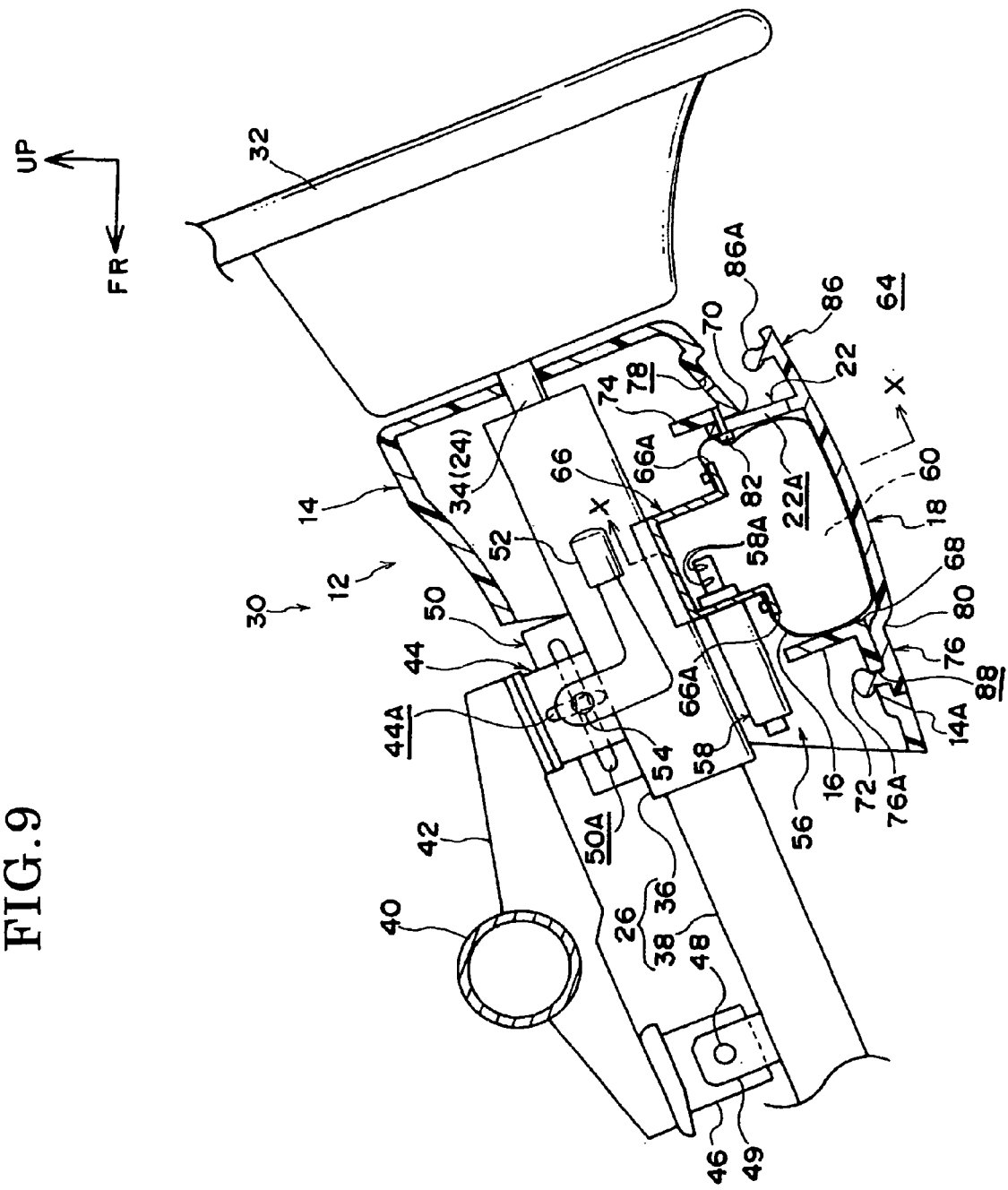
FIG. 9 is a cross sectional view of the knee airbag device in which a knee airbag is deployed.

Next, the advantageous effects obtained when the knee airbag 16 is inflated and deployed will be described. As shown in FIG. 9, when the deployment pressure of the knee airbag 16 is applied to the lid 18, the engagement protrusion 86A is disengaged from the attachment hole 78. As a result, the lid 18 pivots downward around the hinge portion 80 provided in the front portion of the lid 18, until the lid 18 reaches the deployment position regulated by the slide stopper 22, that is, until the upper end of the long hole 22A of the slide stopper 22 reaches the stopper pin 82. Because the slide stopper 22 regulates the opening amount of the lid 18, it is possible to prevent the lid 18 from contacting the knees 62K of the occupant 62 (refer to FIG. 1). Also, because the opening amount of the lid 18 is regulated, it is possible to prevent the knee airbag 16 from being deployed toward the area between the knees 62K of the occupant 62. Thus, the gas in the knee airbag 16 is forcibly delivered toward the portions of the airbag on the right and left sides of the column cover 14. This makes it possible to efficiently deploy the knee airbag 16 toward the areas on the right and left sides of the column cover 14. That is, in the knee airbag device 10, by regulating the downward deployment of the knee airbag 16, it is possible to guide the knee airbag 16 so that the knee airbag 16 is deployed toward the areas on the right and left sides of the column cover 14.

Figure 10:
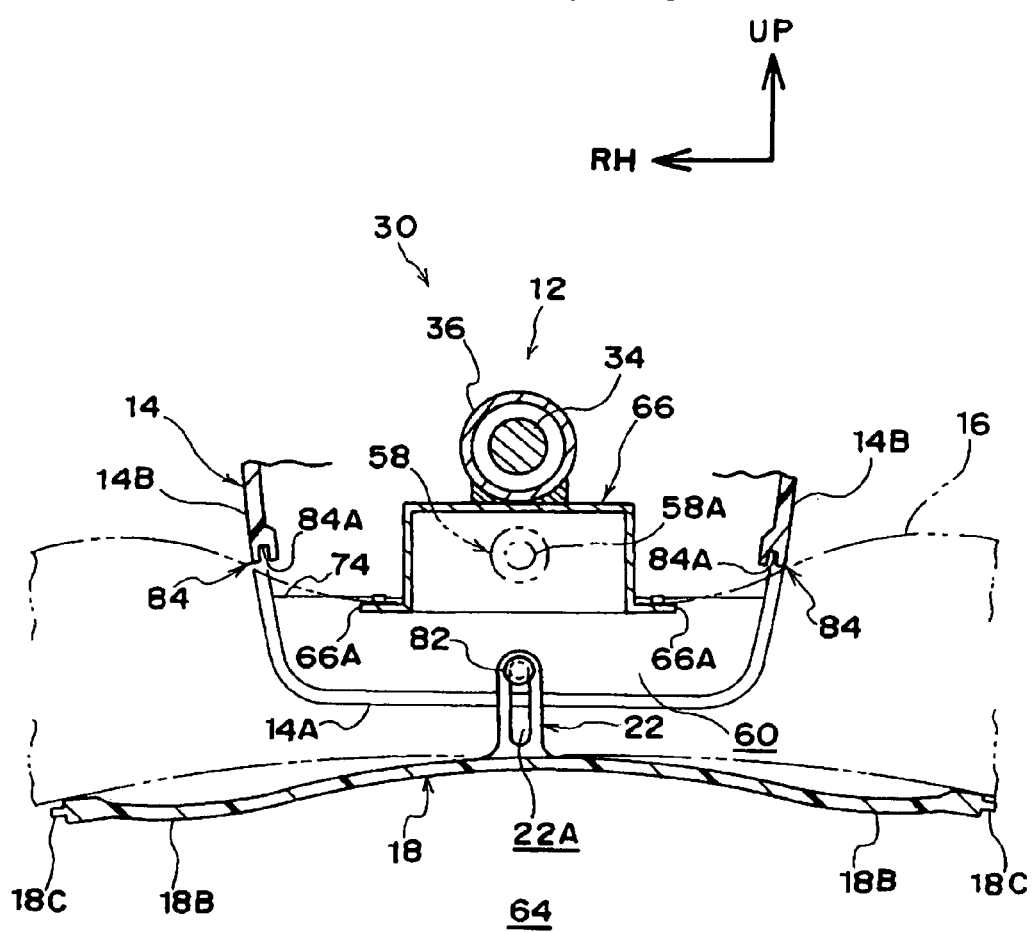
FIG. 10 is a cross sectional view of the knee airbag device in which the knee airbag is deployed, taken along line X-X in FIG. 9.

Also, as shown in FIG. 10, before the lid 18 is opened, the protrusions 18C formed in the side portions 18B of the lid 18 are inserted in the recessed portions 84A formed in the side edge portions 84 that define the side portions of the opening 60. However, the side portions 18B of the lid 18 are not firmly engaged with the side wall portions 14B of the column cover 14. Therefore, when the lid 18 is opened, the side portions 18B are easily disengaged from the side wall portions 14B of the column cover 14. Thus, the opening 60, through which the knee airbag 16 expands, is quickly formed to extend in the lower wall portion 14A and the right and left side wall portions 14B. Thus, it is possible to deploy the knee airbag 16 toward the areas on the right and left sides of the column cover 14, along the side edge portions 84 that define the side portions of the opening 60.

As shown in FIG. 9, the front rib 72 and the rear rib 74 provided in the column cover 14 suppress the deployment of the knee airbag 16 in the vehicle-longitudinal direction inside the column cover 14, as in the first embodiment. Also, as shown in FIG. 10, when the knee airbag 16 is deployed, the side portions 18B of the lid 18 fall rightward and leftward, and are deformed, and as a result, the lid 18 is made flat, as in the first embodiment.

Thus, in the knee airbag device 30, it is possible to quickly deploy the knee airbag 16 toward the areas on the right and left sides of the column cover 14 in front of the knees 62K of the occupant 62 (refer to FIG. 1). Thus, it is possible to improve the performance of restraining the knees 62K of the occupant, while satisfying the requirements regarding the stiffness of the column cover 14. Particularly, in the knee airbag device 30, the lid 18 pivots downward around the hinge portion 80 provided in the front portion of the lid 18. Therefore, when a load equal to or above a predetermined value is applied toward the front portion of the steering column 12 in the axial direction from the steering wheel 32, and the upper bracket 44 is removed from the steering support 42, and accordingly, the steering column 12 is contracted toward the front of the vehicle to absorb an impact, it is possible to suppress the interference between the lid 18 and the surface 28R of the instrument panel 28, which is positioned in front of the knees 62K of the occupant 62.

In the embodiment, the slide stopper 22 is provided in the lid 18, and the stopper pin 82 is provided in the column cover 14. However, the invention is not limited to the configuration. For example, the slide stopper 22 may be provided in the column cover 14, and the stopper pin 82 may be provided in the lid 18.

Figure 11A:
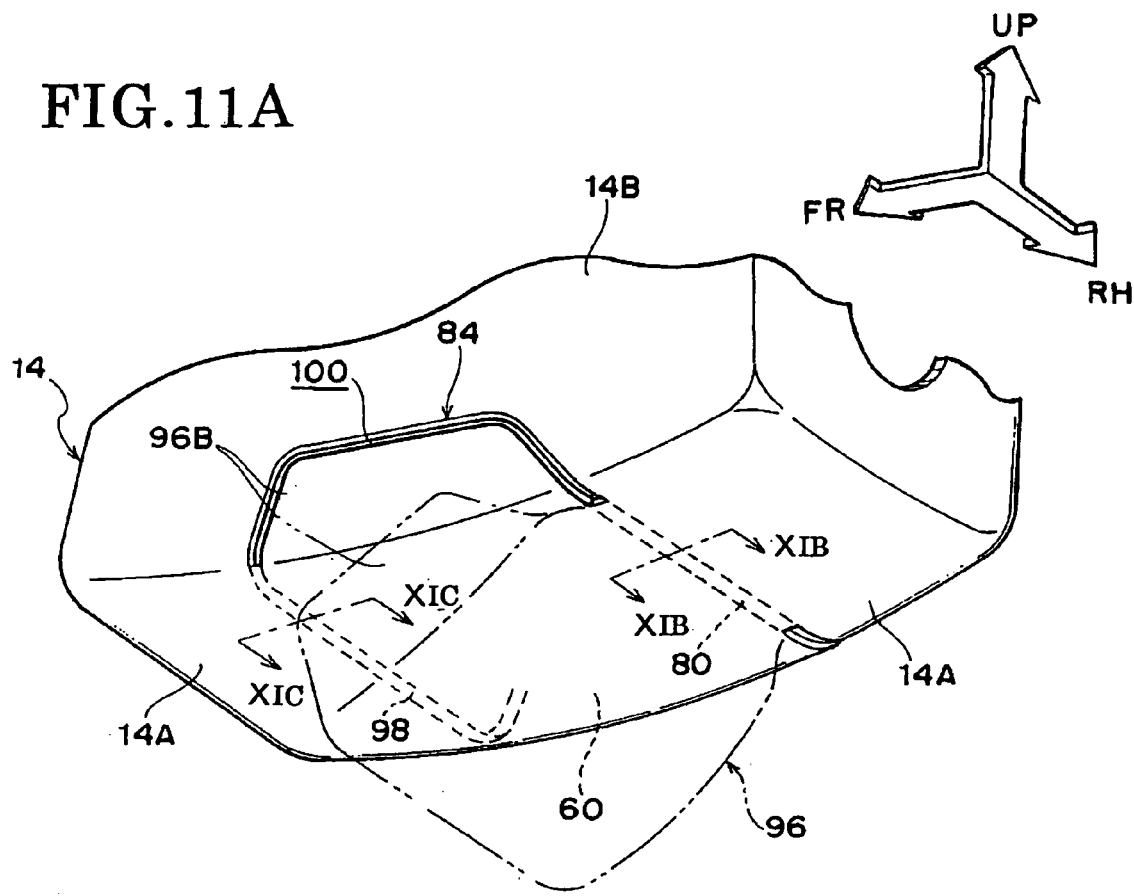
FIG. 11A is a perspective view showing an example in which a lid is formed integrally with a column cover.
Figure 11B:
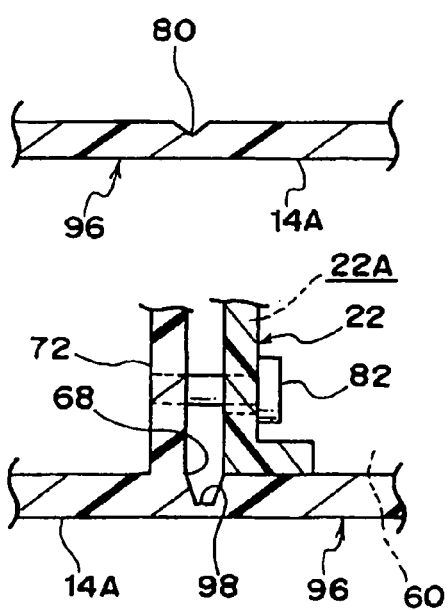
FIG. 11B is an enlarged cross sectional view of a hinge portion, taken along XIB-XIB in FIG. 11A.
Figure 11C:
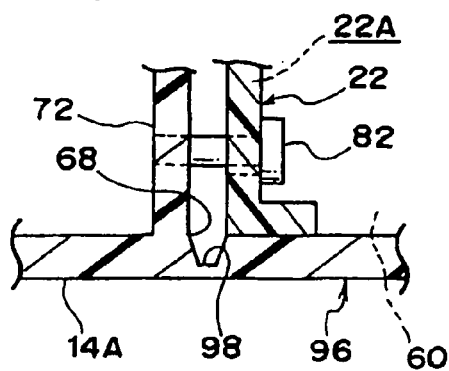
FIG. 11C is an enlarged cross sectional view of a tear portion, taken along XIC-XIC in FIG. 11A.

In each of the above-described embodiments, each of the lid 18 and 90 is formed separately from the column cover 14. However, the invention is not limited to this configuration. For example, as shown in FIG. 11A, a lid 96 may be formed integrally with the column cover 14. In this example shown in FIG. 11A, the hinge portion 80, which extends in the vehicle-width direction, is provided in the rear end portion of the lid 96. The hinge portion 80 supports the lid 96 when the lid 96 is opened. A thin tear portion 98, which extends in the vehicle-width direction, is provided between the front end portion of the lid 96 and the lower wall portion 14A of the column cover 14. The tear portion 98 is formed so that the tear portion 98 is torn when the deployment pressure of the knee airbag 16 (refer to FIG. 2) is applied to the lid 96. As shown in FIGS. 11B and 11C, the tear portion 98 is thinner than the hinge portion 80. Also, in this example, the slide stopper 22 is provided adjacent to the front edge portion 68 that defines the lower portion of the opening 60. The slide stopper 22 functions as the opening amount regulation portion that regulates the opening amount of the lid 96. In FIG. 11C, the slide stopper 22 is fixed to the lid 96. However, the invention is not limited to this configuration. The slide stopper 22 may be formed integrally with the lid 96.

The right and left side portions 96B of the lid 96 are apart from the side edge portions 84 that define the side portions of the opening 60 in the side wall portions 14B of the column cover 14 so that the right and left side portions 96B are easily removed from the side wall portions 14B when the lid 96 is opened. A slit 100 is provided between each side portion 96B and the corresponding side wall portion 14B. The phrase "the side portions 96B are apart from the side edge portions 84 that define the side portions of the opening 60" signifies the configuration in which the side portions 96B are completely apart from the side edge portions 84 that define the side portions of the opening 60 as shown in FIG. 11A, and also signifies, for example, the configuration in which slits are provided along each side edge portion 84 that defines the side portion of the opening 60, and each side portion 96B of the lid 96 is connected with the corresponding side wall portion 14B at a connection portion between each pair of adjacent slits. In this case, it is preferable to set the strength of the connection portion so that appropriate surface stiffness of each side portion 96B is ensured, and the connection portion is easily broken when the lid 96 is opened.

In the example in which the lid 96 is formed integrally with the column cover 14 shown in FIG. 11A, when the knee airbag 16 (refer to FIG. 2) is inflated and deployed, the tear portion 98 around the lid 96 is torn. Accordingly, the lid 96 pivots downward around the hinge portion 80 provided in the rear portion of the lid 96, until the lid 96 reaches the deployment position regulated by the slide stopper 22. As a result, the opening 60, through which the knee airbag 16 expands, is formed to extend in the lower wall portion 14A and the right and left side wall portions 14B of the column cover 14. Thus, it is possible to quickly deploy the knee airbag 16 toward the areas on the right and left sides of the column cover 14, while reducing the cost and weight of each of the column cover 14 and the lid 96. In this example, the lid 96 may pivot downward around the hinge portion 80 provided in the front portion of the lid 96, as in the third embodiment.

In each of the above-described embodiments, each of the slide stoppers 22 and 92 is used as an example of the opening amount regulation portion. However, the opening amount regulation portion is not limited to the slide stoppers 22 and 92. For example, the column cover 14 and the lid 18 may be connected to each other by a strap that has a length corresponding to the opening amount of the lid 18. In this case, when the knee airbag is not opened, the strap may slack, and may be stored inside the column cover 14.

What is claimed is:

1. A knee airbag device comprising:
   a knee airbag that is disposed in a folded state inside a column cover that covers a steering column, wherein when the knee airbag receives gas, the knee airbag is inflated and deployed from an inside of the column cover toward knees of an occupant;
   a lid that is provided in the column cover, and that covers an opening through which the knee airbag expands, wherein when the lid is opened by a deployment pressure of the knee airbag, the opening is formed to extend in a lower wall portion and right and left side wall portions of the column cover; and
   an opening amount regulation portion that regulates an opening amount of the lid, wherein the opening amount regulation portion is a member that connects the column cover to the lid, and
   the lid is movable with respect to the column cover.

2. The knee airbag device according to claim 1, wherein:
   a hinge portion is provided in a first end portion of the lid in an axial direction of the steering column;
   the hinge portion supports the lid when the lid is opened; and
   the opening amount regulation portion is provided in a second end portion of the lid, which is opposite to the first end portion.

3. The knee airbag device according to claim 2, wherein:
   the lid pivots around the hinge portion until the lid reaches a deployment position regulated by the opening amount regulation portion.

4. The knee airbag device according to claim 2, wherein:
   the lid includes a lower portion that covers a lower portion of the opening in the lower wall portion of the column cover, and side portions that cover side portions of the opening in the side wall portions of the column cover; and
   at least a length of the lower portion of the lid in a vehicle-longitudinal direction is longer than a length of the lower portion of the opening in the lower wall portion of the column cover in the vehicle-longitudinal direction.

5. The knee airbag device according to claim 4, wherein:
   the first end portion of the lid is a rear end portion of the lid;
   the lower portion of the lid includes a front extension portion positioned ahead of a front edge portion of the column cover, which defines the lower portion of the opening;
   a first protrusion is provided on an inner surface of the front extension portion;
   a first attachment hole is formed in the lower wall portion of the column cover at a position ahead of the front edge portion;
   the first protrusion is engaged with the first attachment hole; and
   when the deployment pressure of the knee airbag reaches a first predetermined value, the first protrusion is disengaged from the first attachment hole, and the second end portion of the lid is moved downward so that the lid is opened.

6. The knee airbag device according to claim 5, wherein:
   the lower portion of the lid further includes a rear extension portion positioned behind a rear edge portion of the column cover, which defines the lower portion of the opening;
   a second protrusion is provided on an inner surface of the rear extension portion;
   a second attachment hole is formed in the lower wall portion of the column cover at a position behind the rear edge portion;
   the second protrusion is engaged with the second attachment hole; and
   size of the second protrusion and size of the second attachment hole are set so that the second protrusion is not disengaged from the second attachment hole when the deployment pressure of the knee airbag reaches the first predetermined value.

7. The knee airbag device according to claim 4, wherein
   the first end portion of the lid is a front end portion of the lid;
   the lower portion of the lid includes a rear extension portion positioned behind a rear edge portion of the column cover, which defines the lower portion of the opening;
   a first protrusion is provided on an inner surface of the rear extension portion;
   a first attachment hole is formed in the lower wall portion of the column cover at a position behind the rear edge portion;
   the first protrusion is engaged with the first attachment hole; and
   when the deployment pressure of the knee airbag reaches a first predetermined value, the first protrusion is disengaged from the first attachment hole, and the second end portion of the lid is moved downward so that the lid is opened.

8. The knee airbag device according to claim 7, wherein:
   the lower portion of the lid further includes a front extension portion positioned ahead of a front edge portion of the column cover, which defines the lower portion of the opening;
   a second protrusion is provided on an inner surface of the front extension portion;
   a second attachment hole is formed in the lower wall portion of the column cover at a position ahead of the front edge portion;
   the second protrusion is engaged with the second attachment hole; and
   size of the second protrusion and size of the second attachment hole are set so that the second protrusion is not disengaged from the second attachment hole when the deployment pressure of the knee airbag reaches the first predetermined value.

9. The knee airbag device according to claim 4, wherein:
   edges of the side portions of the lid are engaged with side edge portions of the column cover, which define side portions of the opening in the side wall portions of the column cover, in a manner such that the edges of the side portions of the lid can be disengaged from the side edge portions of the column cover.

10. The knee airbag device according to claim 4, wherein:
    hinge portions are formed in the lid at border portions between the lower portion and the side portions, and extend in an axial direction of the steering column; and
    the hinge portions support the side portions of the lid when the side portions of the lid are opened toward right and left side in a vehicle-width direction.

11. The knee airbag device according to claim 1, wherein
    the opening amount regulation portion is provided in each of both end portions of the lid in an axial direction of the steering column.

12. The knee airbag device according to claim 1, wherein
    the lid is formed integrally with the column cover.

13. The knee airbag device according to claim 1, wherein:
the lid is formed separately from the column cover; and
the lid is disposed to cover the opening.

14. The knee airbag device according to claim 1, wherein:
right and left side portions of the lid are apart from side edge portions of the column cover, which define side portions of the opening in the side wall portions of the column cover.

15. The knee airbag device according to claim 1, wherein:
the opening amount of the lid is a distance between a lowest portion of the lid and the lower wall portion of the column cover when the lid is opened; and
the opening amount regulation portion regulates the opening amount of the lid so that the opening amount is equal to or less than a distance between the lid and the knees of the occupant when the lid is closed.

16. The knee airbag device according to claim 1, wherein:
the member is fixed to one of the column cover and the lid, and has a long hole extending in a vehicle-height direction, and a pin portion that is fixed to the other of the column cover and the lid, and inserted in the long hole, and that is movable in the vehicle-height direction in the long hole; and
the opening amount of the lid is set by a length of the long hole.

17. The knee airbag device according to claim 1, wherein:
a rib stands on an inner surface of the column cover at least at one of a front edge portion and a rear edge portion in a vehicle-longitudinal direction, the rib restricts a deployment of the airbag in an axial direction of the steering column; and
the front edge portion and the rear edge portion define a lower portion of the opening in the lower wall portion of the steering column.

18. The knee airbag device according to claim 1, wherein:
the knee airbag is stored inside the column cover such that the knee airbag is positioned in a side portion of the opening in each of the side wall portions of the column cover in a lateral view of the knee airbag device.

19. The knee airbag device according to claim 1, wherein:
the opening amount regulation portion regulates the opening amount of the lid so that the knee airbag is deployed toward areas on right and left sides of the column cover, along side edge portions of the column cover, which define side portions of the opening in the side wall portions of the column cover.

* * * * *